United States Patent
Hayes, Jr.

(10) Patent No.: US 6,530,081 B1
(45) Date of Patent: Mar. 4, 2003

(54) METHODS, SYSTEMS AND COMPUTER PROGRAM PRODUCTS FOR CONTROLLING APPLICATIONS/PREFERENCES OF A PERVASIVE COMPUTING DEVICE

(75) Inventor: Kent F. Hayes, Jr., Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/451,475

(22) Filed: Nov. 30, 1999

(51) Int. Cl.⁷ .............................................. G06F 9/455
(52) U.S. Cl. ...................... 717/176; 709/223; 709/400
(58) Field of Search ................................. 717/168, 174, 717/176, 175, 178, 177, 169, 171; 709/200, 212, 213, 248, 205, 235, 105, 410, 223

(56) References Cited

U.S. PATENT DOCUMENTS

| | | | | |
|---|---|---|---|---|
| 5,717,955 A | * | 2/1998 | Swinehart | 710/62 |
| 5,909,544 A | * | 6/1999 | Anderson, II et al. | 709/208 |
| 6,105,066 A | * | 8/2000 | Hayes et al. | 709/223 |
| 6,167,450 A | * | 12/2000 | Angwin et al. | 709/227 |
| 6,295,541 B1 | * | 9/2001 | Bodnar et al. | 707/203 |
| 6,324,578 B1 | * | 11/2001 | Cox et al. | 709/223 |
| 6,327,594 B1 | * | 12/2001 | Van Huben et al. | 707/200 |
| 6,330,676 B1 | * | 12/2001 | Kelsey | 713/200 |
| 6,345,288 B1 | * | 2/2002 | Reed et al. | 709/201 |
| 6,345,308 B1 | * | 2/2002 | Abe | 709/248 |
| 6,367,077 B1 | * | 4/2002 | Brodersen et al. | 717/170 |
| 6,373,505 B1 | * | 4/2002 | Bellamy et al. | 345/772 |
| 6,438,382 B1 | * | 8/2002 | Boesch et al. | 455/456 |
| 6,457,030 B1 | * | 9/2002 | Adams et al. | 707/523 |

OTHER PUBLICATIONS

Ranganathan et al, "Advertising in a pervasive computing environment", ACM WMC, pp 10–14, 2002.*
Banavar et al, "Callenges: an application model for pervasive computing", ACM MOBICOM pp 266–274, 2000.*
Castro et al, "An adaptive approach to indexing pervaisve data", AMC MobiDE, pp 14–19, 2001.*
Smith et al," Scalable multimedia delivery for pervasive computing", ACM Multimedia, pp 131–140, 1999.*

* cited by examiner

Primary Examiner—Anil Khatri
(74) Attorney, Agent, or Firm—Myers Bigel Sibley & Sajovec, P.A.; Jeanine S. Ray-Yarletts

(57) ABSTRACT

Methods, systems and computer program products are provided which control information provided to a pervasive computing device when the pervasive computing device synchronizes with a data processing system by defining a list of environments associated with the pervasive computing device and associating information items to be provided to the pervasive computing device by the data processing system with environments in the list of environments. User input is obtained at the pervasive computing device selecting an environment and the data processing system notified of the selected environment. The information items associated with the selected environment are then provided from the data processing system to the pervasive computing device responsive to notification of the selected environment.

57 Claims, 6 Drawing Sheets

METHODS, SYSTEMS AND COMPUTER PROGRAM PRODUCTS FOR CONTROLLING APPLICATIONS/PREFERENCES OF A PERVASIVE COMPUTING DEVICE

FIELD OF THE INVENTION

The present invention relates to loading and unloading of applications and/or preferences onto a data processing system in general and in particular to the loading and unloading of applications and/or preferences onto a pervasive computing device with limited storage capabilities.

BACKGROUND OF THE INVENTION

With the increasing mobility of today's society, the demand for mobile computing capabilities has also increased. Many workers and professionals are downsizing their laptop computers to smaller palm-top or hand-held devices, such as personal digital assistants (PDAs). In addition, many people now utilize cellular telephones to access the Internet and to perform various other computing functions. Computing devices including, but not limited to, PDAs, cellular telephones, and computing devices utilized within appliances and automobiles are often collectively referred to as "pervasive" computing devices. Many handheld computing devices utilize the Microsoft® Windows CE, 3Com Palm Computing®, and Symbion Epoc platforms as well as web browsers such as HandWeb from SmartCode, Inc. and the Pocket Internet Explorer from Microsoft, Inc. As used herein, the term "pervasive computing device" refers to a data processing system which may connect to another data processing system and is intended to include PDAs, laptop and portable computers, pen-based portable computers, wireless telephones, smart phones, screenphones, copiers and other office equipment, appliances, factory controllers, etc.

Unfortunately, as the size of pervasive computing devices has decreased, typically, the capabilities of the devices for stand alone operation have also decreased. Such devices generally have reduced amounts of memory and little or no permanent storage capabilities. As a result, pervasive computing devices may have limited capabilities for maintaining large numbers of applications loaded on the pervasive computing device and may be limited to only a subset of the applications available for a device. Furthermore, the applications which a user may want to utilize on a pervasive computing device may change based on the environment or use to which the device is to be put. Thus, it may be necessary to unload certain applications from a pervasive computing device and load other applications onto a pervasive computing device depending on the desires of a user of the device.

In addition to changes in applications which are loaded on a pervasive computing device, it may also be beneficial to change preferences or data associated with applications as the use or environment of the pervasive computing device changes. Thus, for example, a user may have a mapping application which displays a map based on a user preference. When the user utilizes the pervasive computing device in a new location, the user may want to change the displayed map to display a map of the new location.

Conventionally, in order to change the applications, preferences or data of a pervasive computing device, a user would select each application to be loaded individually and set each preference individually, typically while an application is running on the pervasive computing device, however, preferences may also be loaded when the device has access to a source of the applications and preferences. This individual selection of applications and/or preferences may be time consuming and may be error prone. For example, if a user fails to load an application which they need at a certain location they may not have the opportunity subsequently to load that application before it is needed. Thus, a need exists for improvements in control of information provided to pervasive computing devices.

SUMMARY OF THE INVENTION

Accordingly, it is an object of the present invention to provide methods, systems and computer program products which can automatically provide applications and/or preferences for a pervasive computing device without requiring a user to select each application and/or preference individually.

A further object of the present invention is to increase the likelihood that a user will have the application and/or preferences loaded in a pervasive computing device which are suitable for the location and/or environment in which the pervasive computing device will be used.

These and other objects can be provided, according to the present invention, by methods, systems and computer program products which control information provided to a pervasive computing device when the pervasive computing device synchronizes with a data processing system other than the pervasive computing device by defining at least one list of environments associated with the pervasive computing device and associating information items to be provided to the pervasive computing device by the data processing system with environments in the list of environments. User input is obtained at the pervasive computing device to select an environment from the list of environments and the data processing system notified of the selected environment upon synchronization of the pervasive computing device with the data processing system. The information items associated with the selected environment are then provided from the data processing system to the pervasive computing device responsive to notification of the selected environment.

By providing an environment list and associating applications with the environment list, a user may select information items such as applications and/or preferences to be loaded in a pervasive computing device without having to individually select the items. Furthermore, because the information items are associated with an environment such as an intended use or location of the pervasive computing device, the likelihood that a user will forget to load a critical application or data may be reduced.

In a further embodiment of the present invention, a user is associated with the pervasive computing device synchronizing with the data processing system and a list of permitted information items which may be provided to the pervasive computing device upon synchronization is defined for the user. The information items associated with the selected environment from the data processing system may then only be provided to the pervasive computing device responsive to notification of the selected environment if the information items are both associated with the selected environment and permitted for the user associated with the pervasive computing device.

In a still further embodiment of the present invention, information items to be provided to a pervasive computing device irrespective of the environment selected by a user are associated with all of the environments in the list of environments. The information items associated with each of the environments in the list of environments may then be provided from the data processing system to the pervasive computing device upon synchronization irrespective of the environment selected by the user.

Preferably, the information items include applications to be loaded on the pervasive computing device. In such a case, applications which are not associated with the selected environment may be unloaded from the pervasive computing device and applications associated with the selected environment loaded on the pervasive computing device.

In a still further embodiment of the present invention, user input may be obtained to select information items to be obtained from the data processing system. The selected information items may then be obtained from the data processing system when the pervasive computing device synchronizes with the data processing system.

Furthermore, a user may be associated with the pervasive computing device synchronizing with the data processing system and a list of permitted information items defined for the user which may be provided to the pervasive computing device upon synchronization. In such a case, information items which are both associated with the selected environment and permitted for the user associated with the pervasive computing device may be provided from the data processing system to the pervasive computing device responsive to notification of the selected environment. Also, the selected information items obtained from the data processing system when the pervasive computing device synchronizes with the data processing system may be obtained if the selected information items are permitted for the user associated with the pervasive computing device.

In yet another embodiment of the present invention, at least one list of environments associated with the pervasive computing device is defined as a hierarchy of environments associated with a plurality of environments. Then, information items to be provided to the pervasive computing device by the data processing system are associated with environments in the list of environments wherein environments in the hierarchy of environments inherit the associated information items of environments higher in the hierarchy.

In further embodiments of the present invention, the information items are applications and preferences. Furthermore, the environments may be locations and operating environments.

In still another embodiment of the present invention, the at least one list of environments associated with the pervasive computing device is defined at the data processing system and information items to be provided to the pervasive computing device by the data processing system associated with environments in the list of environments at the data processing system. Furthermore, at least one list of environments associated with the pervasive computing device corresponding to the at least one list of environments defined at the data processing system may also be defined at the pervasive computing device. Similarly, information items to be provided to the pervasive computing device by the data processing system may be associated with environments in the list of environments at the pervasive computing device. The information items associated with the at least one list of environments defined at the data processing system may then be reconciled with the information items associated with the at least one list of environments defined at the pervasive computing device to determine the information items to be provided by the data processing system and obtained by the pervasive computing device.

In a particular embodiment, this reconciliation may be provided by determining if the loading of an information item associated with the at least one list of environments defined at the data processing system has been overridden by the association of information items to be provided to the pervasive computing device by the data processing system with environments in the list of environments defined at the pervasive computing device.

In yet another embodiment of the present invention, applications and/or preferences to be loaded on to a pervasive computing device are determined by defining a list of environments, defining a default association of applications and/or preferences associated with each of the environments in the list of environments and defining a user specific association of applications and/or preferences associated with at least one of the environments in the list of environments. User input to select an environment from the list of environments is obtained. It is then determined if a user specific association has been defined for the selected environment. Any conflicts between the user specific association and the default association if a user specific association has been defined for the selected environment are resolved so as to provide a single association of applications and/or preferences associated with the selected environment and the applications and/or preferences from the single association of the applications and/or preferences associated with the selected environment loaded onto the pervasive computing device.

In an embodiment of the present invention where the list of environments is a hierarchical list of environments, children environments in the hierarchical list of environments inherit associations of applications and/or preferences from parent environments in the hierarchical list of environments. Furthermore, any conflicts between associations of applications and/or preferences in children environments with associations of applications and/or preferences in parent environments may be resolved by associations of applications and/or preferences in children environments overriding associations of applications and/or preferences in parent environments.

In a further embodiment, the resolution of any conflicts between the user specific association and the default association may be accomplished by overriding associations of applications and/or preferences of the default association with corresponding associations of applications and/or preferences of the user specific association.

In still another embodiment of the present invention, it may be determined if a first application and/or preference already loaded on the pervasive computing device is not identified in the single association. The first application and/or preference may then be unloaded from the pervasive computing device if the first application and/or preferences is not identified in the single association.

Furthermore, environments may, in one embodiment, be inherited based on user groups and child groups which may inherit environments and associated information elements from their parents.

While the invention has been described above primarily with respect to the method aspects of the invention, both systems and/or computer program products are also provided.

DETAILED DESCRIPTION OF PREFERRED EMBODIMENTS

Figure 1:
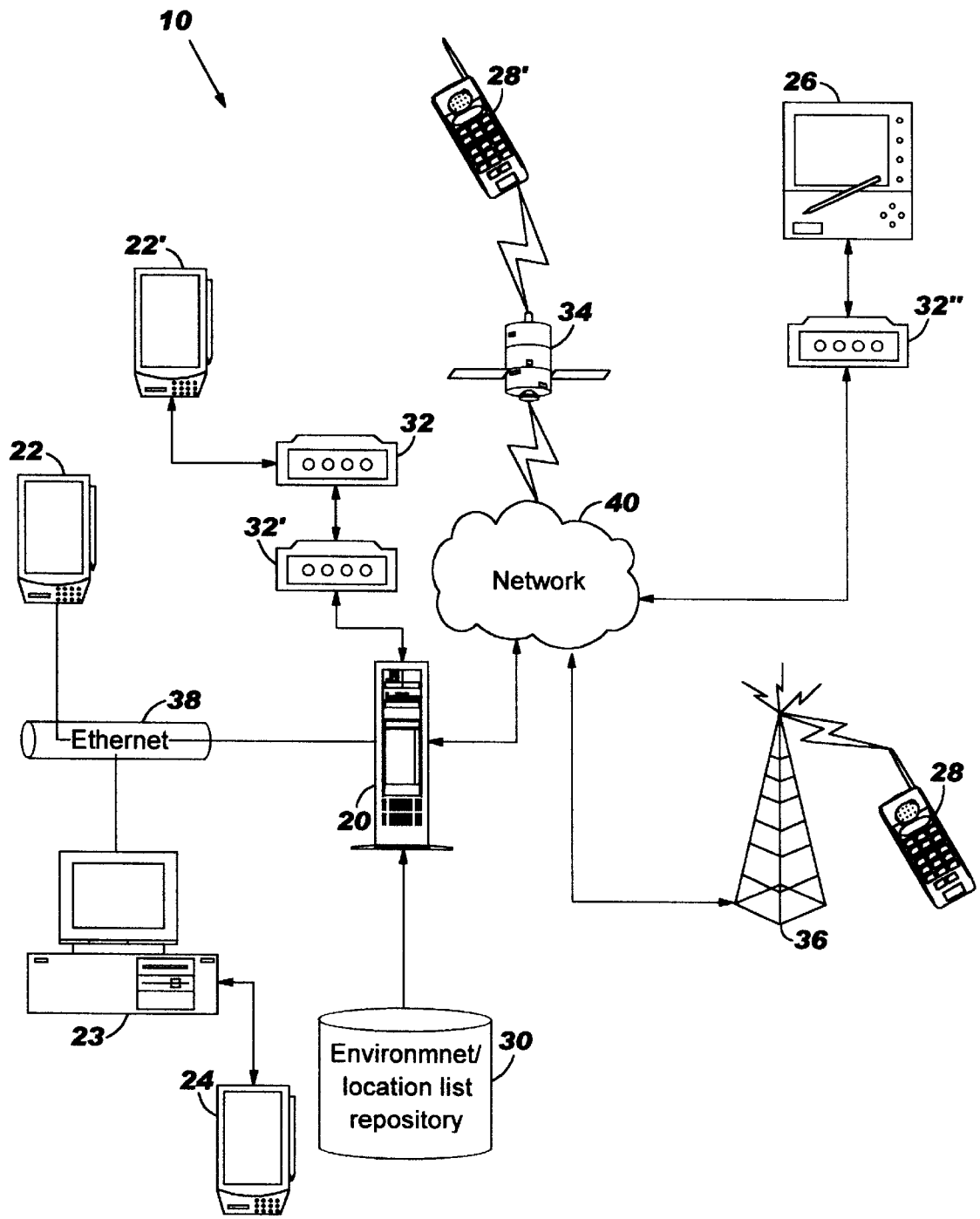
FIG. 1 is a schematic diagram of a computer network suitable for use with the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including, but not limited to, hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to an embodiment of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, the present invention provides for the control of information to a pervasive computing device, such as, for example, the applications and/or preferences loaded on the device, by providing a list of environments/locations and associating information items with those environments/locations. The list may be provided to the pervasive computing device or generated at the pervasive computing device and the environment/location selected by a user. The associated information items will then be loaded onto the pervasive computing device. Thus, the present invention may provide for more accurate and easier customization of a pervasive computing device based on an anticipated environment/location.

FIG. 1 illustrates a system 10 in which the present invention may be beneficially utilized. As seen in FIG. 1, a server 20 may be accessed from a number of differing data processing systems (i.e., computers) such as PDAs 22 and 22', desktop computer 23, PDA 24, pen based computer 26, cellular telephone 28, which may be a smartphone, screenphone or voice only telephone and satellite telephone 28' which may be a smartphone, screenphone or voice-only telephone. These differing data processing systems 22, 22', 23, 24, 26, 28 and 28' may each have differing processing capabilities, data presentation capabilities, operating systems and/or applications which request information from server 20. Furthermore, each of these differing data processing systems 22, 22', 23, 24, 26, 28 and 28' may be utilized by different users with different applications and/or preferences associated with the users. As will be appreciated by those of skill in the art, other types of processing systems may also benefit from utilization of the present invention.

The differing data processing systems 22, 22', 23, 24, 26, 28 and 28' may also utilize different communication techniques for communicating with server 20. For example, PDA 22 and desktop computer 23 may utilize a network interface card to communicate with server 20 over a direct network connection such as the Ethernet 38 illustrated in FIG. 1. PDA 22' may communicate directly with server 20 through modem 32 and modem 32'. PDA 24 is illustrated as communicating with server 20 through desktop computer 23. Similarly, pen based computer 26 may communicate through a modem 32" connection to the network 40 which may be the Internet or an intranet. Cellular telephone 28 may communicate with server 20 through a cellular connection 36 and the network 40. Finally, satellite telephone 28' may communicate with server 20 through a satellite connection 34 and the network 40.

As is further illustrated in FIG. 1, server 20 has access to an environment/location list repository 30. The environment/location list repository 30 may be incorporated in server 20 or may be accessible through a network or other communication connection. The environment/location list repository 30 may also be periodically downloaded or otherwise provided to server 20 and a copy of the environment/location list repository 30 maintained by server 20. The environment/location list repository 30 preferably includes an identification of the applications and/or preferences available to users of processing systems such as the data processing systems 22, 22', 23, 24, 26, and 28 illustrated in FIG. 1 as well as an association of those applications/preferences with environments or locations in lists of environment or locations. The environment/location list repository 30 may include the applications and/or preferences to be provided to data processing systems or may include links to other locations where the applications and/or preferences may be obtained. While the environment/location list repository 30 is illustrated and described in the present application as a single database, as will be appreciated by those of skill in the art, multiple databases may be utilized. As used herein, the term preferences is utilized to describe user selected preferences for an application or data to be utilized with an application.

In general, in a system according to the present invention, when one of data processing systems 22, 22', 23, 24, 26 and 28, initially establishes a connection to a network, a list of environments/locations and associated applications and/or preferences are preferably provided to a "user self help" application executing on the data processing system. The user self help application may then subsequently obtain user input to select the environment/location from the provided list and the associated applications and/or preferences are loaded into the data processing system. Thus, for example, when PDA 24 connects with workstation 23, the environment/location list may be provided to PDA 24 either from the server 20 accessing the environment/location list repository or by utilizing a local copy of the location/environment list maintained at workstation 23. For simplification of the description of the present invention, the present invention will be described with reference to the pervasive computing devices obtaining the environment/location list from a server. However, the environment/location list may be obtained directly from the server over a network, through an intermediate such as a workstation connected to the network or the processing system to which the pervasive computing device may act as a server and provide the environment/location list. Thus, the term "server" is used herein to refer to a source of the environment/location list other than the pervasive computing device. In an alternative embodiment of the present invention, the environment/location list and associated applications and/or preferences are generated at the pervasive computing device.

Furthermore, the use self help application may execute on the pervasive computing device itself or on a workstation or other data processing system to which the pervasive computing device may attach. Thus, for example, the user self help application may execute on workstation 23 and provide selected applications and/or preferences to PDA 24 when PDA 24 is connected to workstation 23.

Figure 2:
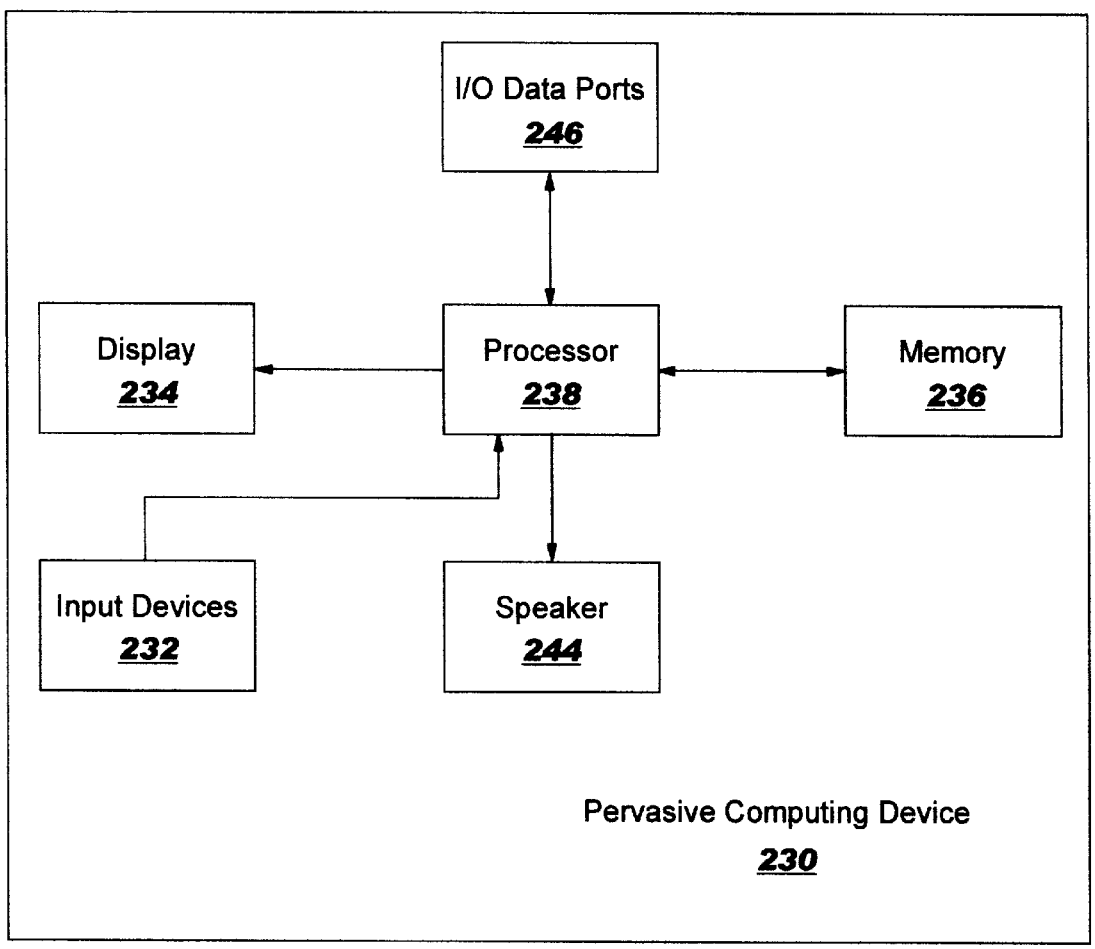
FIG. 2 is a block diagram of a pervasive computing device suitable for use with the present invention.

Referring now to FIG. 2, an exemplary embodiment of a pervasive computing device 230 in accordance with the present invention typically includes input device(s) 232 such as a keyboard or keypad, a display 234, and a memory 236 that communicate with a processor 238. The pervasive computing device 230 may further include a speaker 242, a microphone 244, and an I/O data port(s) 246 that also communicate with the processor 238. The I/O data port 246 can be used to transfer information between the pervasive computing device 230 and another computer system or a network (e.g., the Internet). These components may be conventional components such as those used in many conventional pervasive computing devices which may be configured to operate as described herein.

Figure 3:
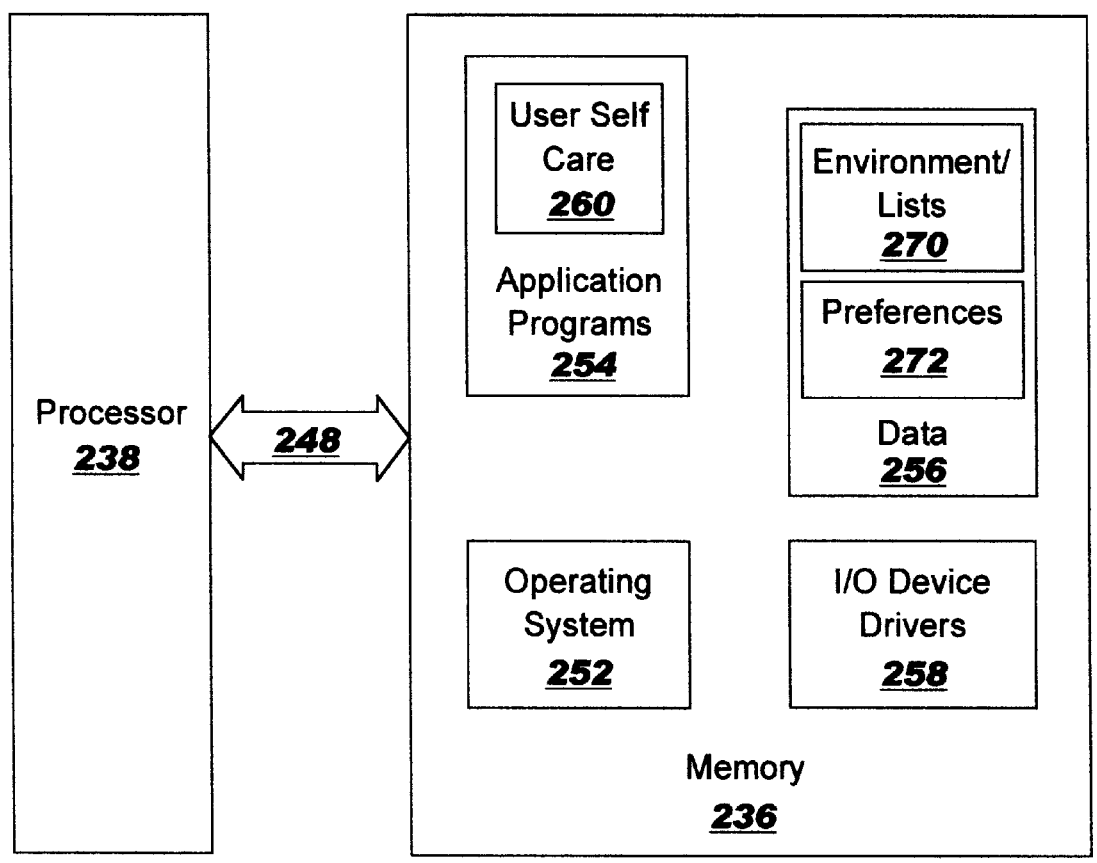
FIG. 3 is a more detailed block diagram of aspects of the pervasive computing device of FIG. 2.

FIG. 3 is a more detailed block diagram of the pervasive computing device 230 that illustrates systems, methods, and computer program products in accordance with the present invention. The processor 238 communicates with the memory 236 via an address/data bus 248. The processor 238 can be any commercially available or custom microprocessor. The memory 236 is representative of the overall hierarchy of memory devices containing the software and data used to implement the functionality of the pervasive computing device 230. The memory 236 can include, but is not limited to, the following types of devices: cache, ROM, PROM, EPROM, EEPROM, flash, SRAM, and DRAM.

As shown in FIG. 3, the memory 236 may hold four major categories of software and data used in the pervasive computing 230: the operating system 252; the application programs 254; the input/output (I/O) device drivers 256; and the data 258. Preferably, the operating system 252 is designed for embedded applications and is relatively compact to make efficient use of the memory 236. The I/O device drivers 256 typically include software routines accessed through the operating system 252 by the application programs 254 to communicate with devices such as the input devices 232, the display 234, the speaker 242, the microphone 244, the I/O data port(s) 246, and certain memory 236 components. The application programs 254 comprise the programs that implement the various features of the pervasive computing device 230. And, finally, the data 258 represents the static and dynamic data used by the application programs 254, operating system 252, I/O device drivers 256, and any other software program that may reside in the memory 236.

As is further seen in FIG. 3, the application programs preferably include a user self care application 260 which carries out the operations for selecting applications and/or preferences to load based on environment/location lists as described herein. Furthermore, the data portion of memory 236 preferably include environment/location lists and/or preferences for applications executing on the pervasive computing device 230. While the user self care application 260 is illustrated as an application in FIG. 3, as will be appreciated by those of skill in the art, the functionality of the user self care application may be incorporated into the operating system 252. Thus, the present invention should not be construed as limited to the configuration of FIG. 3 but is intended to encompass any configuration capable of carrying out the operations described herein.

Furthermore, the pervasive computing device of FIG. 3 also generally describes a server 20 or workstation 23 which may be utilized to load environment/location lists, applications and/or preferences into a pervasive computing device 230. However, in such a utilization, the user self care application 260 may be replaced by a environment/list administration application. Thus, the data processing system illustrated in FIG. 3 may generally describe both the server and pervasive computing devices according to various aspects of the present invention.

Figure 4:
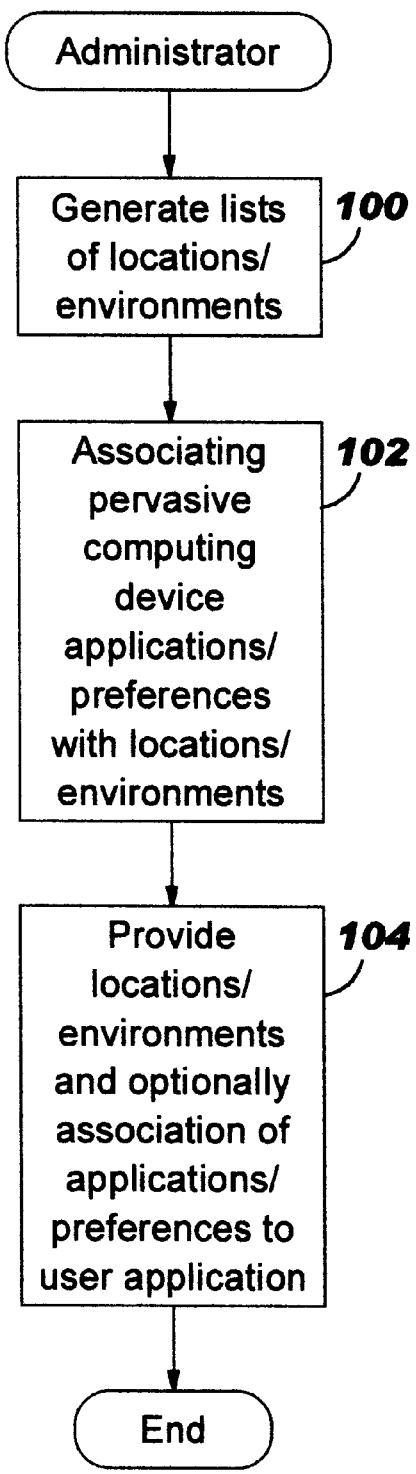
FIG. 4 is a flowchart illustrating administrative operations of a server according to the present invention.

FIG. 4 illustrates operations carried out by an administrative function which may be incorporated into server 20, into workstation 23 or, in an alternative embodiment, incorporated in the pervasive computing device 230. As seen in FIG. 4, lists of locations and/or environments in which a pervasive computing device may be utilized are generated (block 100). These lists may be hierarchical in nature such that relationships between entries in the lists are reflected in the hierarchy of the lists. Applications and/or preferences are then associated with entries in the environment/location lists (block 102). If the lists are hierarchical, then applications and/or preferences associated with a first entry in a list may be inherited by the entries which are associated with the first entry. Thus, for example, a parent entry in the list from which other entries are children may be utilized to specify applications and/or preferences which are loaded if any of the child entries are selected. All other entries in the list may inherit these applications and/or preferences from this parent entry. Thus, a hierarchical relationship with inheritance may be utilized to simplify the association of applications and/or preferences with list entries.

As is further seen in FIG. 4, the environment/location lists and/or the associated applications and/or preferences are provided to the user self care application 260 of the pervasive computing device 230. Such a transfer may be accomplished when a pervasive computing device 230, such as devices 22, 22', 24, 26, 28 or 28', obtain access to server 20 which has access to the environment/location list repository 30. As described above, such access may be accomplished either through direct access to server 20, through indirect access to server 20 or to a replication of server 20 at a workstation or other server. Thus, for example, when PDA 24 synchronizes with workstation 23, the environment/location lists and/or associations with applications and/or preferences may be loaded into PDA 24. In an alternative embodiment, the pervasive computing device 230 may make the environment/location list accessible to the user self care application 260.

Figure 5:
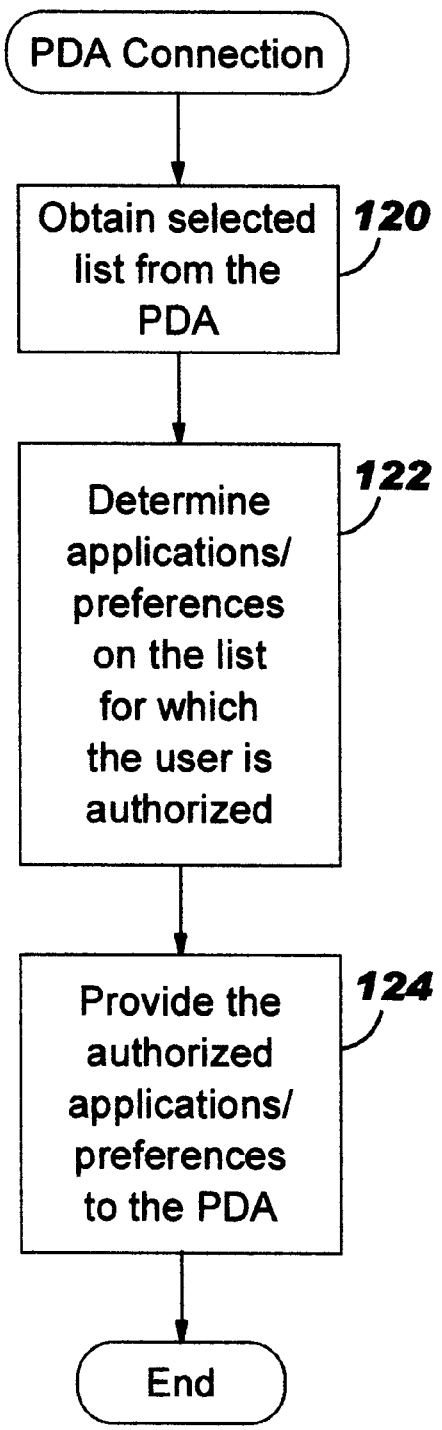
FIG. 5 is a flowchart illustrating operations of a server according to the present invention when a pervasive computing device such as a PDA synchronizes with the server.

When a pervasive computing device 230 subsequently obtains access to server 20, then the operations of FIG. 5 may be carried out. As seen in FIG. 5, the server 20 obtains the selected list from a pervasive computing device 230 such as a PDA (block 120). The server 20 then determines which applications and/or preferences associated with the selected list the user associated with the pervasive computing device 230 is authorized to access (block 122). This optional determination may be made by using a user identification received from the pervasive computing device 230 when the pervasive computing device connects to the server 20 to access a list of authorized applications and/or preferences for users with access to server 20. The list of authorized applications and/or preferences associated with the user may then be compared with the applications and/or preferences of the list selected by the user. After determining which of the applications and/or preferences associated with the selected list the user is authorized to access, these authorized applications and/or preferences may be provided to the pervasive computing device 230 (block 124).

Figure 6:
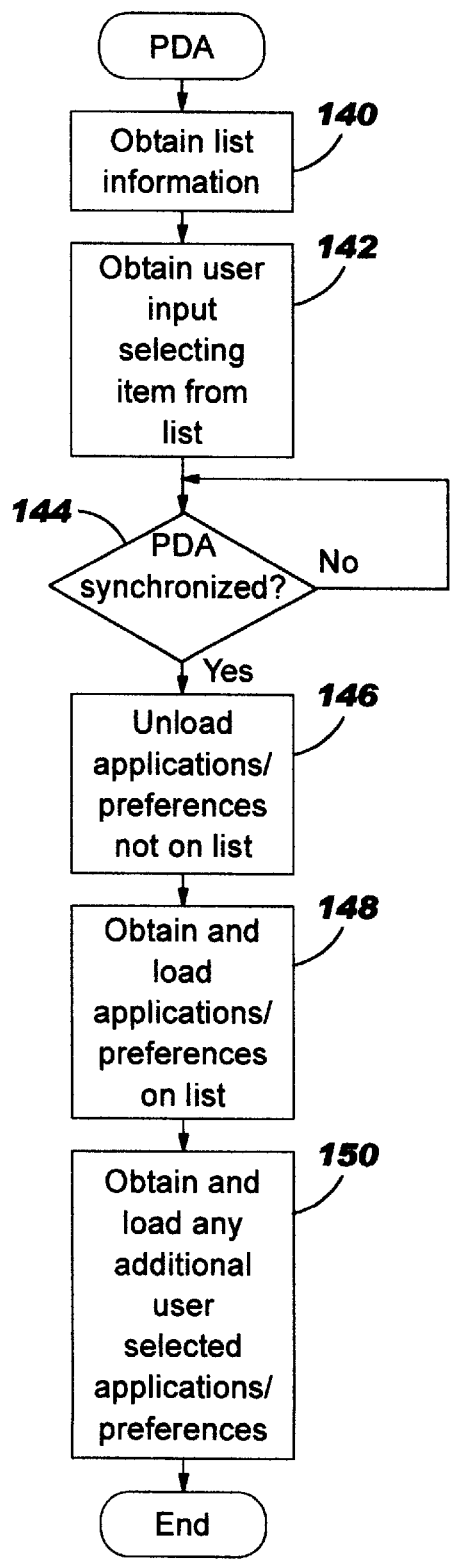
FIG. 6 is a flowchart illustrating operations of a user self help application of a pervasive computing device according to the present invention.

FIG. 6 illustrates operations of a pervasive computing device 230, such as a PDA, according to the present invention. As seen in FIG. 6, the user self care application 260 of the pervasive computing device 230 obtains the environment/location list from server 20 (block 140). User input is then obtained by the user self care application 260 to select an environment/location from the list (block 142). The pervasive computing device 230 then waits until the device is synchronized (i.e. has access to a source of the applications and/or preferences specified by the list) (block 144). The user self care application 260 may also allow a user to customize the applications and/or preferences loaded upon synchronization. This customization may be carried out by establishing an association of applications and/or preferences based on the user identification and an environment/location. Furthermore, this customization may include overriding the load of applications and/or preferences which are associated by the server 20 with the selected environment/location. Thus, in addition to allowing a user to select an item from the environment/location list, the user self care application 260 may also obtain input from the user as to any user modifications to the application and/or preferences which are to be loaded when the pervasive computing device 230 synchronizes.

As is further seen in FIG. 6, the pervasive computing device 230 may obtain the environment/location lists during one connection to the server 2, and then later re-connect to obtain the applications and/or preferences associated with a selected item in the list (block 104). Therefore, as will be appreciated by those of skill in the art in light of the present disclosure, the environment/location lists may be obtained once by the pervasive computing device 230 and then updated or may be obtained periodically or each time the pervasive computing device 230 synchronizes for subsequent use by the pervasive computing device 230.

In any event, when the pervasive computing device synchronizes with the server 20, the pervasive computing device 230 unloads applications which are not identified as associated with the environment/location selected or which have not been selected by the user as a modification to the applications and/or preferences to be loaded (block 146). The pervasive computing device 230 then obtains or is provided by the server 20, the applications and/or preferences specified by the selected item on the environment/location list and not overridden by a corresponding environment/location association for the user (block 148).

Any additional user selected applications and/or preferences may also be obtained and loaded (block 150). Preferably, the additional applications and/or preferences that are loaded are those specified as belonging to all environments which were not specified to be unloaded or modified by the selected environment. These applications and/or preferences may be specified by the end user, specified by the administrator for user groups in which the user is a member, or specified for the end user by the administrator. Individual information elements may be overridden by the end user or the administrator.

The flowcharts and block diagrams of FIGS. 2 through 6 illustrate the architecture, functionality, and operation of a possible implementation of the server and pervasive computing device according to the present invention. In this regard, each block in the flow charts represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

Furthermore, while the present invention has been described with reference to the environment/location lists being specified by an administrator at a server, as will be appreciated by those of skill in the art, the environment/location lists may be specified by a user utilizing the user self care application 260. In such a case, the user self care application could be provided with a list of the applications and/or preferences for which a user has access rights and the user self care application 260 associate these applications and/or preferences with environments/locations based on user input. In such a case, the pervasive computing device 230 would not need to obtain the lists from server 20 but could request the applications from server 20 to be loaded. Thus, in essence, the operations of FIG. 4 may be carried out either at the server 20 or at a pervasive computing device 230.

Through the use of the present invention, a user may load and unload applications and/or preferences for a pervasive computing device based on selection of an expected location or use for the device. The user need not know where the applications and/or preferences are stored or remember which applications and/or preferences are suitable for the environment or location. Thus, the likelihood that a user will forget to load a particularly important application and/or preference may be substantially reduced while also increasing the user friendliness of the pervasive computing device and overcoming the storage limitations which are typical of such devices.

While the present invention has been described with reference to the block diagrams and flow charts above, it may also be beneficial to illustrate operations of the present invention with reference to examples. In the first example, a user of a PDA (USER1) has associated with them a list of applications which they are permitted to access. This "access rights" list is illustrated in Table 1 below.

TABLE 1

USER1 Access Rights List

| Software | Access Rights |
|---|---|
| Work Application 1 | Permit |
| Work Application 2 | Permit |
| Game 1 | Permit |
| Game 2 | Permit |
| Game 3 | Permit |
| Calendar Application | Permit |
| Address Book Application | Permit |
| Remote Control Application | Permit |
| S9 Application | Deny |
| S10 Application | Deny |

In addition to having a list of access rights, USER1 also has a list of applications and/or preferences to be loaded when the PDA of USER1 is synchronized. These applications are limited to the ones which USER1 has access to as identified in Table 1. Thus, in the present example, Table 2 illustrates the software to be loaded for USER1 when the PDA is synchronized.

TABLE 2

USER1 Software Selection

| Software | Load on Sync |
|---|---|
| Work Application 1 | No |
| Work Application 2 | No |
| Game 1 | No |
| Game 2 | No |
| Game 3 | No |
| Calendar Application | Yes |
| Address Book Application | Yes |
| Remote Control Application | Yes |

The deltas to the list of applications and/or preferences associated with the applications specified in Table 2 are determined by the selection of an environment. If no environment is selected, then the default applications and/or preferences to be loaded for all environments may be loaded.

USER1 may have specified for them, or specify themselves, environments having applications utilized during the week, on the weekend, at a summer home and applications common to all environments. These associations of environments with applications and/or preferences are illustrated in Tables 3 through 6 below.

TABLE 3

WEEK environment for User Context USER1

| Software | Load | Associated Preferences/Data |
|---|---|---|
| Work Application 1 | Yes | Data for Work Application 1 |
| Work Application 2 | Yes | Data for Work Application 2 |

TABLE 4

WEEKEND environment for User Context USER1

| Software | Load | Associated Preferences/Data |
|---|---|---|
| Game 1 | Yes | Data for Game 1 |
| Game 2 | Yes | Data for Game 2 |

TABLE 5

ALL ENVIRONMENTS environment for User Context USER1

| Software | Load | Associated Preferences/Data |
|---|---|---|
| Calendar Application | Yes | Data for Calendar Application |
| Address Book Application | Yes | Data for Address Book Application |
| Remote Control Application | Yes | Data for remote at Home |

TABLE 6

SUMMER HOME environment for User Context USER1

| Software | Load | Associated Preferences/Data |
|---|---|---|
| Remote Control Application | Yes | Data for remote at Summer Home |

Utilizing this environment/location list and application/preference associations, then when USER1 first synchronizes their PDA with the WEEK environment selected, Work Application 1 with Data for Work Application 1 and Work Application 2 with Data for Work Application are loaded as a result of what has been specified by USER1 as the WEEK environment. Also, however, as a result of what has been specified by USER1 as the ALL ENVIRONMENTS environment, Calendar Application with Data for Calendar Application, Address Book Application with Data for Address Book Application and Remote Control Application with Data for remote at Home are also loaded in the PDA.

USER1 then at a later time runs the user self care application 260 and selects the WEEKEND environment. When the PDA is again synchronized, Work Application 1 and Data for Work Application 1 and Work Application 2 and Data for Work Application 2 are unloaded because they are not specified in the WEEKEND environment for USER1 and are not specified for ALL ENVIRONMENTS. Also, Game 1 and Data for Game 1 and Game 2 and Data for Game 2 are loaded because they are specified as loaded in the WEEKEND environment (see Table 4). Note also that the Calendar Application, Address Book Application and Remote Control Application and their associated data remain unchanged because no change was specified for these applications and preferences.

USER1 then later runs the self care application 260 again and selects the SUMMER HOME environment. When the PDA is again synchronized, because Game 1 and Game 2 are not specified for this environment and are not specified to be loaded for ALL ENVIRONMENTS, these applications and their associated data are unloaded from the PDA. Also, because the data for the Remote Control Application is different from that for the ALL ENVIRONMENTS environment, the data for the Remote Control Application is loaded as Data for Summer Home remote. The application Remote Control Application need not be reloaded as only the data is specified as differing between the ALL ENVIRONMENTS environment and the SUMMER HOME environment. Thus, after synchronization utilizing the SUMMER HOME environment, the Calendar Application and the Data for Calendar Application, the Address Book Application and the Data for Address Book Application and the Remote Control Application and the Data for Summer Home remote are loaded in the PDA.

As can be seen from this first example, the applications and/or preferences for differing environments may be automatically loaded upon synchronization. Furthermore, these applications and/or preferences need not be individually selected each time by a user which may reduce the likelihood that a user forget to load a needed application or data.

The above example presented a series of nonhierarchical environments specified by a user. A second example of the present invention illustrates a hierarchical environment specific to all users in a user group and to a specific user, USER2. As with the first example, access rights are defined for users in a user group utilizing for example, a Profile Management tool such as provided by International Business Machines Corporation's On Demand Server product. An access rights list for the present example is illustrated in Table 7 below.

TABLE 7

USER2 Access Rights List

| Software | Access Rights |
|---|---|
| Map Application | Permit |
| Calendar Application | Permit |
| Address Book Application | Permit |
| Game 1 Application | Permit |
| Game 2 Application | Permit |
| Remote Control Application | Permit |
| S7 Application | Deny |
| S8 Application | Deny |
| S9 Application | Deny |
| S10 Application | Deny |

In addition to having a list of access rights, USER2 also has a list of applications and/or preferences to be loaded when the PDA of USER2 is synchronized. These applications are limited to the ones which USER2 has access to as identified in Table 7. Thus, in the present example, Table 8 illustrates the software to be loaded for USER2 when the PDA is synchronized and are common to all environments.

TABLE 8

USER2 Software Selection

| Software | Load on Sync |
|---|---|
| Map Application | No |
| Calendar Application | Load w/associated data |
| Address Book Application | Load w/associated data |

TABLE 8-continued

USER2 Software Selection

| Software | Load on Sync |
|---|---|
| Game 1 Application | Load w/associated data |
| Game 2 Application | Load w/associated data |
| Remote Control Application | Load w/associated data |

The deltas to both the list of applications to be loaded and preferences associated with the applications as specified in Table 8 are determined by USER2 selecting an environment from an environment/location list. If no environment is selected then the ALL ENVIRONMENTS environment is loaded. Specification of the environment/location lists may be performed at both the user and the user group levels. In the present example, the highest user group level is specified as AllUsers.

Tables 9 through 16 illustrate the association of applications and/or preferences with environments for both the AllUsers user group and USER2. The environments illustrated in Tables 9 through 16 include the Business Travel hierarchy with Business Travel being the root and branches from Business Travel for IBM Germany and IBM Austin. Also illustrated is the root environment, Work.

TABLE 9

BUSINESS TRAVEL environment for AllUsers

| Software | Load | Associated Preferences/Data |
|---|---|---|
| Map Application | Yes | Data for RTP Map |

TABLE 10

BUSINESS TRAVEL-IBM GERMANY environment for AllUsers

| Software | Load | Associated Preferences/Data |
|---|---|---|
| Inherited Map Application | Inherited Load | Data for IBM Germany Map |

TABLE 11

BUSINESS TRAVEL-IBM AUSTIN environment for AllUsers

| Software | Load | Associated Preferences/Data |
|---|---|---|
| Inherited Map Application | Inherited Load | Data for IBM Austin Map |

TABLE 12

WORK environment for AllUsers

| Software | Load | Associated Preferences/Data |
|---|---|---|
| S7 Application | Yes | no preference data |

TABLE 13

WORK environment for USER2

| Software | Load | Associated Preferences/Data |
|---|---|---|
| Inherited from AllUsers | Inherited Load | inherited from AllUsers |

TABLE 14

BUSINESS TRAVEL environment for USER2

| Software | Load | Associated Preferences/Data |
|---|---|---|
| Inherited Map Application | Inherited Load | Inherited Data for RTP Map |
| Game 1 Application | Unload | Data for Game 1 Application |
| Game 2 Application | Unload | Data for Game 2 Application |
| Remote Control Application | Unload | Data for Remote Control Application |

TABLE 15

BUSINESS TRAVEL-IBM GERMANY environment for USER2

| Software | Load | Associated Preferences/Data |
|---|---|---|
| Inherited Map Application | Inherited Load | Inherited Data for IBM Germany Map |
| Inherited Game 1 Application | Inherited Unload | Inherited Data for Game 1 Application |
| Inherited Game 2 Application | Inherited Unload | Inherited Data for Game 2 Application |
| Inherited Remote Control Application | Inherited Unload | Inherited Data for Remote Control Application |

TABLE 16

ALL ENVIRONMENTS environment for USER2

| Software | Load | Associated Preferences/Data |
|---|---|---|
| Calendar Application | Yes | Data for Calendar Application |
| Address Book Application | Yes | Data for Address Book Application |
| Game 1 Application | Yes | Data for Game 1 Application |
| Game 2 Application | Yes | Data for Game 2 Application |
| Remote Control Application | Yes | Data for Remote Control Application |

Utilizing the above associations, when USER2 synchronizes for the first time with no environment specified, then the Calendar Application and Data for the Calendar Application, the Address Book Application and Data for the Address Book Application, the Game 1 Application and Data for the Game 1 Application, the Game 2 Application and Data for the Game 2 Application and the Remote Control Application and Data for the Remote Control Application are loaded into USER2's PDA.

This loading results from the combination of the ALL ENVIRONMENTS environment for both AllUsers and USER2 (see Table 8 and Table 16).

When USER2 runs the user self care application 260 and selects the BUSINESS TRAVEL—IBM GERMANY environment, then, when the PDA is synchronized the applications and data specified by the selected environment are loaded. Thus, because of the BUSINESS TRAVEL environment specified by USER2, the Game 1 Application, Game 2 Application and Remote Control Application and associated data are unloaded. The unloading of these applications and data specification inherited by the BUSINESS TRAVEL—IBM GERMANY environment from the BUSINESS TRAVEL environment for USER2.

In addition to unloading the applications and data the Map Application and the Data for the IBM Germany Map are loaded. This application and data are loaded because the the Map Application was configured for AllUsers to be loaded when the BUSINESS TRAVEL environment was selected (see Table 9). The specification for this application to be loaded for AllUsers is inherited by the BUSINESS TRAVEL—IBM GERMANY environment from the BUSINESS TRAVEL environment (see Table 10). The loading of the data for the map of IBM Germany was specified for AllUsers (see Table 10). The loading of the Map Application and the associated data was inherited by the USER2 environment for BUSINESS TRAVEL—IBM GERMANY as seen in Table 15.

The applications for the ALL ENVIRONMENTS environment which have not been overridden by another environment remain loaded on the device. Thus, the Calendar Application and the Address Book Application and associated data remain loaded on the device. Thus, after synchronizing the PDA with the BUSINESS TRAVEL—IBM GERMANY environment selected, the applications and data loaded on the device would be the Calendar Application, the Address Book Application and the Map Application with the data for the map of IBM Germany.

When USER2 uses the user self care application 260 to select the WORK environment, when the PDA is again synchronized the Map Application and associated data are unloaded. The Map Application and data are unloaded because the Map Application is not specified in the WORK environment or in the ALL ENVIRONMENT environment. In addition to removing the Map Application from the PDA, the Game 1 Application and Data for the Game 1 Application, the Game 2 Application and Data for the Game 2 Application and the Remote Control Application and Data for the Remote Control Application are loaded on the PDA. These applications and data are loaded because they are specified in the ALL ENVIRONMENTS environment and have not been overridden by another environment either for the AllUsers or for USER2.

It should also be noted that the S7 Application specified in the WORK environment for AllUsers is not loaded when USER2 synchronizes their PDA because USER2 is denied access to the S7 Application (see Table 7). Also, the applications and data specified by ALL ENVIRONMENTS which have not been overridden also remain on the PDA. Thus, the Calendar Application and the Address Book Application remain on the device.

As may be seen from these examples, the present invention may provide a hierarchy of priorities of associations such that environments in a list of environments may inherit associations from other environments in the list. Thus, for example, a default load of applications and/or preferences may be provided by a parent in the list and modified by children of the parent in the list so as to override the default load. This override process may be carried out so as to unload applications, alter the preferences for an application or add additional applications. Furthermore, higher priority may be given to associations which are specific to a user over associations which are specific to a group of users.

Thus, a two tiered hierarchy may be developed where environments inherit associations from other environments while being able to override these associations and where users or subsets of user groups inherit associations from user groups while being able to override these associations. Through this two level hierarchy conflicting associations between the environments and/or user(s) or user group(s) may be automatically resolved without user intervention so as to provide a single association of applications and/or preferences when a user selects and environment from the list of environments.

As will be appreciated by one of skill in the art, this concept may be extended to multi-tiered hierarchies. Just as the specification of environments can be extended and the loading/unloading of information items and modified preference information for applications to be loaded can be overridden for/by a user at the user's context, the concept may be extended to any number of subgroups in a hierarchy of group contexts. However, a precedence order may need to be established to resolve conflicts between definitions for differing subgroups if a user may be a member of multiple groups. With regard to determining precedence within a hierarchy of groups, if a child group may only have one parent, and child groups may be a parent of another child group, then a hierarchy may be established where child groups take precedence over parent groups. Such an override precedence may resolve any conflicts between child and parent groups in the hierarchy.

In light of the ability of the present invention to resolve conflicts between associations in the hierarchy of environments and/or users, it may be beneficial to have the user self help application 260 resolve such conflicts based on any environment/location lists provided by server 20 or generated by a user at the pervasive computing device 230. In such a case, the applications and/or preferences to be loaded on to the pervasive computing device 230 may be requested by the user self care application regardless of whether the application and/or preference is specified by the list provided by server 20 or generated at pervasive computing device 230. Thus, an application and/or preference may be provided to the pervasive computing device 230 in response to a request from the pervasive computing device or automatically when the pervasive computing device connects with the server 20.

As is further seen from these examples, through the use of a hierarchical structure the present invention may provide for flexibility in establishing which applications may be loaded or unloaded on a pervasive computing device. Furthermore, through the use of inheritance and the ability to override the loading of applications and/or preferences the present invention may provide both user control and administrative control over the applications and/or preferences loaded on a pervasive computing device.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of controlling information provided to a pervasive computing device when the pervasive computing device synchronizes with a data processing system other than the pervasive computing device and accessible to the pervasive computing device, comprising the steps of:
    defining at least one list of environments associated with the pervasive computing device;
    associating information items to be provided to the pervasive computing device by the data processing system with environments in the list of environments;
    obtaining user input selecting an environment from the list of environments;
    notifying the data processing system of the selected environment; and
    providing the information items associated with the selected environment from the data processing system to the pervasive computing device responsive to notification of the selected environment.

2. A method according to claim 1, wherein the user input is obtained at the pervasive computing device and wherein the data processing system is notified of the selected environment upon synchronization of the pervasive computing device with the data processing system.

3. A method according to claim 2, wherein the step of defining at least one list of environments associated with the pervasive computing device comprises the step of defining, at the data processing system, at least one list of environments associated with the pervasive computing device; and
    wherein the step of associating information items to be provided to the pervasive computing device by the data processing system with environments in the list of environments comprises the step of associating, at the data processing system, information items to be provided to the pervasive computing device by the data processing system with environments in the list of environments.

4. A method according to claim 3, further comprising the steps of:
    defining, at the pervasive computing device, at least one list of environments associated with the pervasive computing device corresponding to the at least one list of environments defined at the data processing system;
    associating, at the pervasive computing device, information items to be provided to the pervasive computing device by the data processing system with environments in the list of environments; and
    reconciling the information items associated with the at least one list of environments defined at the data processing system with the information items associated with the at least one list of environments defined at the pervasive computing device to determine the information items to be provided by the data processing system and obtained by the pervasive computing device.

5. A method according to claim 4, wherein the step of reconciling comprises the step of determining if the loading of an information item associated with the at least one list of environments defined at the data processing system has been overridden by the association information items to be provided to the pervasive computing device by the data processing system with environments in the list of environments defined at the pervasive computing device.

6. A method according to claim 1, further comprising the steps of:
    associating a user with the pervasive computing device synchronizing with the data processing system;
    defining, for the user associated with the pervasive computing device, a list of permitted information items which may be provided to the pervasive computing device upon synchronization; and
    wherein the step of providing the information items associated with the selected environment from the data processing system to the pervasive computing device responsive to notification of the selected environment comprises the step of providing information items which are both associated with the selected environment and permitted for the user associated with the pervasive computing device from the data processing system to the pervasive computing device responsive to notification of the selected environment.

7. A method according to claim 1, further comprising the steps of:
    associating with each of the environments in the list of environments, information items to be provided to a pervasive computing device irrespective of the environment selected by a user; and providing the information items associated with each of the environments in the list of environments from the data processing system to the pervasive computing device upon synchronization irrespective of the environment selected by the user.

8. A method according to claim 1, wherein the information items include applications to be loaded on the pervasive computing device and wherein the step of providing comprises the steps of:

unloading from the pervasive computing device applications which are not associated with the selected environment; and loading applications on the pervasive computing device which are associated with the s elected environment.

9. A method according to claim 8, further comprising the steps of:

associating a user with the pervasive computing device synchronizing with the data processing system;

defining, for the user associated with the pervasive computing device, a list of permitted information items which may be provided to the pervasive computing device upon synchronization;

wherein the step of providing the information items associated with the selected environment from the data processing system to the pervasive computing device responsive to notification of the selected environment comprises the step of providing information items which are both associated with the selected environment and permitted for the user associated with the pervasive computing device from the data processing system to the pervasive computing device responsive to notification of the selected environment; and wherein the step of obtaining the selected information items from the data processing system when the pervasive computing device synchronizes with the data processing system comprises the step of obtaining the selected information items from the data processing system when the pervasive computing device synchronizes with the data processing system if the selected information items are permitted for the user associated with the pervasive computing device.

10. A method according to claim 1, further comprising the steps of:

obtaining user input to select information items to be obtained from the data processing system; and obtaining the selected information items from the data processing system when the pervasive computing device synchronizes with the data processing system.

11. A method according to claim 1, wherein the step of defining at least one list of environments associated with the pervasive computing device comprises the step of defining a hierarchy of environments associated with a plurality of environments; and wherein the step of associating information items to be provided to the pervasive computing device by the data processing system with environments in the list of environments comprises the step of associating information items to be provided to the pervasive computing device by the data processing system with environments in the list of environments wherein environments in the hierarchy of environments inherit the associated information items of environments higher in the hierarchy.

12. A method according to claim 1, wherein the information items comprise applications, preferences or data for use by an application.

13. A method according to claim 1, wherein the environments comprise geographic locations of the pervasive computing device and operating environments.

14. A system for controlling information provided to a pervasive computing device when the pervasive computing device synchronizes with a data processing system other than the pervasive computing device and accessible to the pervasive computing device, comprising:

means for defining at least one list of environments associated with the pervasive computing device;

means for associating information items to be provided to the pervasive computing device by the data processing system with environments in the list of environments;

means for obtaining user input selecting an environment of the list of environments;

means for notifying the data processing system of the selected environment; and means for providing the information items associated with the selected environment from the data processing system to the pervasive computing device responsive to notification of the selected environment.

15. A system according to claim 14, wherein the user input is obtained at the pervasive computing device and wherein the data processing system is notified of the selected environment upon synchronization of the pervasive computing device with the data processing system.

16. A system according to claim 15, further comprising:

means for obtaining user input to select information items to be obtained from the data processing system; and means for obtaining the selected information items from the data processing system when the pervasive computing device synchronizes with the data processing system.

17. A system according to claim 16, further comprising:

means for associating a user with the pervasive computing device synchronizing with the data processing system;

means for defining, for the user associated with the pervasive computing device, a list of permitted information items which may be provided to the pervasive computing device upon synchronization;

wherein the means for providing the information items associated with the selected environment from the data processing system to the pervasive computing device responsive to notification of the selected environment comprises means for providing information items which are both associated with the selected environment and permitted for the user associated with the pervasive computing device from the data processing system to the pervasive computing device responsive to notification of the selected environment; and wherein the means for obtaining the selected information items from the data processing system when the pervasive computing device synchronizes with the data processing system comprises means for obtaining the selected information items from the data processing system when the pervasive computing device synchronizes with the data processing system if the selected information items are permitted for the user associated with the pervasive computing device.

18. A system according to claim 14, further comprising:

means for associating a user with the pervasive computing device synchronizing with the data processing system;

means for defining, for the user associated with the pervasive computing device, a list of permitted information items which may be provided to the pervasive computing device upon synchronization; and wherein the means for providing the information items associated with the selected environment from the data processing system to the pervasive computing device responsive to notification of the selected environment comprises means for providing information items which are both associated with the selected environment and permitted for the user associated with the pervasive computing device from the data processing system to the pervasive computing device responsive to notification of the selected environment.

19. A system according to claim 14, further comprising:
means for associating with each of the environments in the list of environments, information items to be provided to a pervasive computing device irrespective of the environment selected by a user; and
means for providing the information items associated with each of the environments in the list of environments from the data processing system to the pervasive computing device upon synchronization irrespective of the environment selected by the user.

20. A system according to claim 14, wherein the information items include applications to be loaded on the pervasive computing device and wherein the means for providing comprises the steps of:
means for unloading from the pervasive computing device applications which are not associated with the selected environment; and
means for loading applications on the pervasive computing device which are associated with the selected environment.

21. A system according to claim 14, wherein the means for defining at least one list of environments associated with the pervasive computing device comprises means for defining a hierarchy of environments associated with a plurality of environments; and
wherein the means for associating information items to be provided to the pervasive computing device by the data processing system with environments in the list of environments comprises means for associating information items to be provided to the pervasive computing device by the data processing system with environments in the list of environments wherein environments in the hierarchy of environments inherit the associated information items of environments higher in the hierarchy.

22. A system according to claim 14, wherein the information items comprise applications, preferences or data for use by an application.

23. A system according to claim 14, wherein the environments comprise geographic locations of the pervasive computing device and operating environments.

24. A system according to claim 14, wherein the means for defining at least one list of environments associated with the pervasive computing device comprises means for defining, at the data processing system, at least one list of environments associated with the pervasive computing device; and
wherein the means for associating information items to be provided to the pervasive computing device by the data processing system with environments in the list of environments comprises means for associating, at the data processing system, information items to be provided to the pervasive computing device by the data processing system with environments in the list of environments.

25. A system according to claim 24, further comprising:
means for defining, at the pervasive computing device, at least one list of environments associated with the pervasive computing device corresponding to the at least one list of environments defined at the data processing system;
means for associating, at the pervasive computing device, information items to be provided to the pervasive computing device by the data processing system with environments in the list of environments; and
means for reconciling the information items associated with the at least one list of environments defined at the data processing system with the information items associated with the at least one list of environments defined at the pervasive computing device to determine the information items to be provided by the data processing system and obtained by the pervasive computing device.

26. A system according to claim 25, wherein the means for reconciling comprises means for determining if the loading of an information item associated with the at least one list of environments defined at the data processing system has been overridden by the association information items to be provided to the pervasive computing device by the data processing system with environments in the list of environments defined at the pervasive computing device.

27. A computer program product for controlling information provided to a pervasive computing device when the pervasive computing device synchronizes with a data processing system other than the pervasive computing device and accessible to the pervasive computing device, comprising:
a computer-readable storage medium having computer-readable program code embodied in said medium, said computer-readable program code comprising:
computer-readable program code that defines at least one list of environments associated with the pervasive computing device;
computer-readable program code that associates information items to be provided to the pervasive computing device by the data processing system with environments in the list of environments;
computer-readable program code that obtains user input selecting an environment of the list of environments;
computer-readable program code notifies the data processing system of the selected environment; and
computer-readable program code provides the information items associated with the selected environment from the data processing system to the pervasive computing device responsive to notification of the selected environment.

28. A computer program product according to claim 27, wherein the user input is obtained at the pervasive computing device and wherein the data processing system is notified of the selected environment upon synchronization of the pervasive computing device with the data processing system.

29. A computer program product according to claim 28, further comprising:
computer-readable program code that obtains user input to select information items to be obtained from the data processing system; and
computer-readable program code that obtains the selected information items from the data processing system when the pervasive computing device synchronizes with the data processing system.

30. A computer program product according to claim 29, further comprising:

computer-readable program code that associates a user with the pervasive computing device synchronizing with the data processing system;

computer-readable program code that defines, for the user associated with the pervasive computing device, a list of permitted information items which may be provided to the pervasive computing device upon synchronization;

wherein the computer-readable program code that provides the information items associated with the selected environment from the data processing system to the pervasive computing device responsive to notification of the selected environment comprises computer-readable program code that provides information items which are both associated with the selected environment and permitted for the user associated with the pervasive computing device from the data processing system to the pervasive computing device responsive to notification of the selected environment; and wherein the computer-readable program code that obtains the selected information items from the data processing system when the pervasive computing device synchronizes with the data processing system comprises computer-readable program code that obtains the selected information items from the data processing system when the pervasive computing device synchronizes with the data processing system if the selected information items are permitted for the user associated with the pervasive computing device.

31. A computer program product according to claim 27, further comprising:

computer-readable program code that associates a user with the pervasive computing device synchronizing with the data processing system;

computer-readable program code that defines, for the user associated with the pervasive computing device, a list of permitted information items which may be provided to the pervasive computing device upon synchronization; and wherein the computer-readable program code that provides the information items associated with the selected environment from the data processing system to the pervasive computing device responsive to notification of the selected environment comprises computer-readable program code that provides information items which are both associated with the selected environment and permitted for the user associated with the pervasive computing device from the data processing system to the pervasive computing device responsive to notification of the selected environment.

32. A computer program product according to claim 27, further comprising:

computer-readable program code that associates with each of the environments in the list of environments, information items to be provided to a pervasive computing device irrespective of the environment selected by a user; and computer-readable program code that provides the information items associated with each of the environments in the list of environments from the data processing system to the pervasive computing device upon synchronization irrespective of the environment selected by the user.

33. A computer program product according to claim 27, wherein the information items include applications to be loaded on the pervasive computing device and wherein the computer-readable program code that provides comprises:

computer-readable program code that unloads from the pervasive computing device applications which are not associated with the selected environment; and computer-readable program code that loads applications on the pervasive computing device which are associated with the selected environment.

34. A computer program product according to claim 27, wherein the computer-readable program code that defines at least one list of environments associated with the pervasive computing device comprises computer-readable program code that defines a hierarchy of environments associated with a plurality of environments; and wherein the computer-readable program code that associates information items to be provided to the pervasive computing device by the data processing system with environments in the list of environments comprises computer-readable program code that associates information items to be provided to the pervasive computing device by the data processing system with environments in the list of environments wherein environments in the hierarchy of environments inherit the associated information items of environments higher in the hierarchy.

35. A computer program product according to claim 27, wherein the information items comprise applications, preferences and/or data for use by an application.

36. A computer program product according to claim 27, wherein the environments comprise geographic locations of the pervasive computing device and operating environments.

37. A computer program product according to claim 27, wherein the computer-readable program code that defines at least one list of environments associated with the pervasive computing device comprises computer-readable program code that defines, at the data processing system, at least one list of environments associated with the pervasive computing device; and wherein the computer-readable program code that associates information items to be provided to the pervasive computing device by the data processing system with environments in the list of environments comprises computer-readable program code that associates, at the data processing system, information items to be provided to the pervasive computing device by the data processing system with environments in the list of environments.

38. A computer program product according to claim 37, further comprising:

computer-readable program code that defines, at the pervasive computing device, at least one list of environments associated with the pervasive computing device corresponding to the at least one list of environments defined at the data processing system;

computer-readable program code that associates, at the pervasive computing device, information items to be provided to the pervasive computing device by the data processing system with environments in the list of environments; and computer-readable program code that reconciles the information items associated with the at least one list of environments defined at the data processing system with the information items associated with the at least one list of environments defined at the pervasive computing device to determine the information items to be provided by the data processing system and obtained by the pervasive computing device.

39. A computer program product according to claim 38, wherein the computer-readable program code that reconciles comprises computer-readable program code that determines if the loading of an information item associated with the at least one list of environments defined at the data processing system has been overridden by the association information items to be provided to the pervasive computing device by the data processing system with environments in the list of environments defined at the pervasive computing device.

40. A method of controlling applications, preferences and/or data to be loaded onto a pervasive computing device, the method comprising the steps of:
  defining a list of environments;
  defining a default association of applications, preferences and/or data associated with each of the environments in the list of environments;
  defining a user specific association of applications, preferences and/or data associated with at least one of the environments in the list of environments;
  obtaining user input to select an environment from the list of environments;
  determining if a user specific association has been defined for the selected environment;
  resolving any conflicts between the user specific association and the default association if a user specific association has been defined for the selected environment so as to provide a single association of applications and/or preferences associated with the selected environment; and
  loading onto the pervasive computing device, the applications, preferences and/or data from the single association of the applications, preferences and/or data associated with the selected environment.

41. A method according to claim 40, wherein the list of environments is a hierarchical list of environments and wherein children environments in the hierarchical list of environments inherit associations of applications, preferences and/or data from parent environments in the hierarchical list of environments.

42. A method according to claim 41, further comprising the step of resolving any conflicts between associations of applications, preferences and/or data in children environments with associations of applications, preferences and/or data in parent environments.

43. A method according to claim 42, wherein associations of applications, preferences and/or data in children environments override associations of applications, preferences and/or data in parent environments.

44. A method according to claim 40, wherein the step of resolving any conflicts between the user specific association and the default association if a user specific association has been defined for the selected environment so as to provide a single association of applications, preferences and/or data associated with the selected environment comprises the step of overriding associations of applications and/or preferences of the default association with corresponding associations of applications, preferences and/or data of the user specific association.

45. A method according to claim 40, further comprising the step of:
  determining if a first application, preference and/or data already loaded on the pervasive computing device is not identified in the single association; and
  unloading the first application, preference and/or data from the pervasive computing device if the first application, preference and/or data is not identified in the single association.

46. A system for controlling applications and/or preferences to be loaded onto a pervasive computing device, comprising:
  means for defining a list of environments;
  means for defining a default association of applications, preferences and/or data associated with each of the environments in the list of environments;
  means for defining a user specific association of applications, preferences and/or data associated with at least one of the environments in the list of environments;
  means for obtaining user input to select an environment from the list of environments;
  means for determining if a user specific association has been defined for the selected environment;
  means for resolving any conflicts between the user specific association and the default association if a user specific association has been defined for the selected environment so as to provide a single association of applications, preferences and/or data associated with the selected environment; and
  means for loading onto the pervasive computing device, the applications, preferences and/or data from the single association of the applications, preferences and/or data associated with the selected environment.

47. A system according to claim 46, wherein the list of environments is a hierarchical list of environments and wherein children environments in the hierarchical list of environments inherit associations of applications, preferences and/or data from parent environments in the hierarchical list of environments.

48. A system according to claim 47, further comprising means for resolving any conflicts between associations of applications, preferences and/or data in children environments with associations of applications, preferences and/or data in parent environments.

49. A system according to claim 48, wherein associations of applications, preferences and/or data in children environments override associations of applications, preferences and/or data in parent environments.

50. A system according to claim 46, wherein the means for resolving any conflicts between the user specific association and the default association if a user specific association has been defined for the selected environment so as to provide a single association of applications, preferences and/or data associated with the selected environment comprises means for overriding associations of applications, preferences and/or data of the default association with corresponding associations of applications, preferences and/or data of the user specific association.

51. A system according to claim 46, further comprising:
  means for determining if a first application, preference and/or data already loaded on the pervasive computing device is not identified in the single association; and
  means for unloading the first application, preference and/or data from the pervasive computing device if the first application, preference and/or data is not identified in the single association.

52. A computer program product for controlling applications, preferences and/or data to be loaded onto a pervasive computing device, comprising:
  a computer-readable storage medium having computer-readable program code embodied in said medium, said computer-readable program code comprising:
    computer-readable program code that defines a list of environments;

computer-readable program code that defines a default association of applications, preferences and/or data associated with each of the environments in the list of environments;

computer-readable program code means that defines a user specific association of applications, preferences and/or data associated with at least one of the environments in the list of environments;

computer-readable program code that obtains user input to select an environment from the list of environments;

computer-readable program code that determines if a user specific association has been defined for the selected environment;

computer-readable program code that resolves any conflicts between the user specific association and the default association if a user specific association has been defined for the selected environment so as to provide a single association of applications, preferences and/or data associated with the selected environment; and computer-readable program code that loads onto the pervasive computing device, the applications, preferences and/or data from the single association of the applications, preferences and/or data associated with the selected environment.

53. A computer program product according to claim 52, wherein the list of environments is a hierarchical list of environments and wherein children environments in the hierarchical list of environments inherit associations of applications, preferences and/or data from parent environments in the hierarchical list of environments.

54. A computer program product according to claim 53, further comprising computer-readable program code that resolves any conflicts between associations of applications, preferences and/or data in children environments with associations of applications, preferences and/or data in parent environments.

55. A computer program product according to claim 54, wherein associations of applications, preferences and/or data in children environments override associations of applications, preferences and/or data in parent environments.

56. A computer program product according to claim 52, wherein the computer-readable program code that resolves any conflicts between the user specific association and the default association if a user specific association ha s been defined for the selected environment so as to provide a single association of applications, preferences and/or data associated with the selected environment comprises computer-readable program code that overrides associations of applications, preferences and/or data of the default association with corresponding associations of applications, preferences and/or data of the user specific association.

57. A computer program product according to claim 52, further comprising:

computer-readable program code that determines if a first application, preference and/or data already loaded on the pervasive computing device is not identified in the single association; and computer-readable program code that unloads the first application, preference and/or data from the pervasive computing device if the first application preference and/or data is not identified in the single association.

* * * * *